Oct. 8, 1929.  S. R. HOWARD  1,730,613
WRAPPING MACHINE
Filed Jan. 5, 1927    12 Sheets-Sheet 1

Inventor:
Stanley R. Howard
by J. Stanley Churchill
Atty

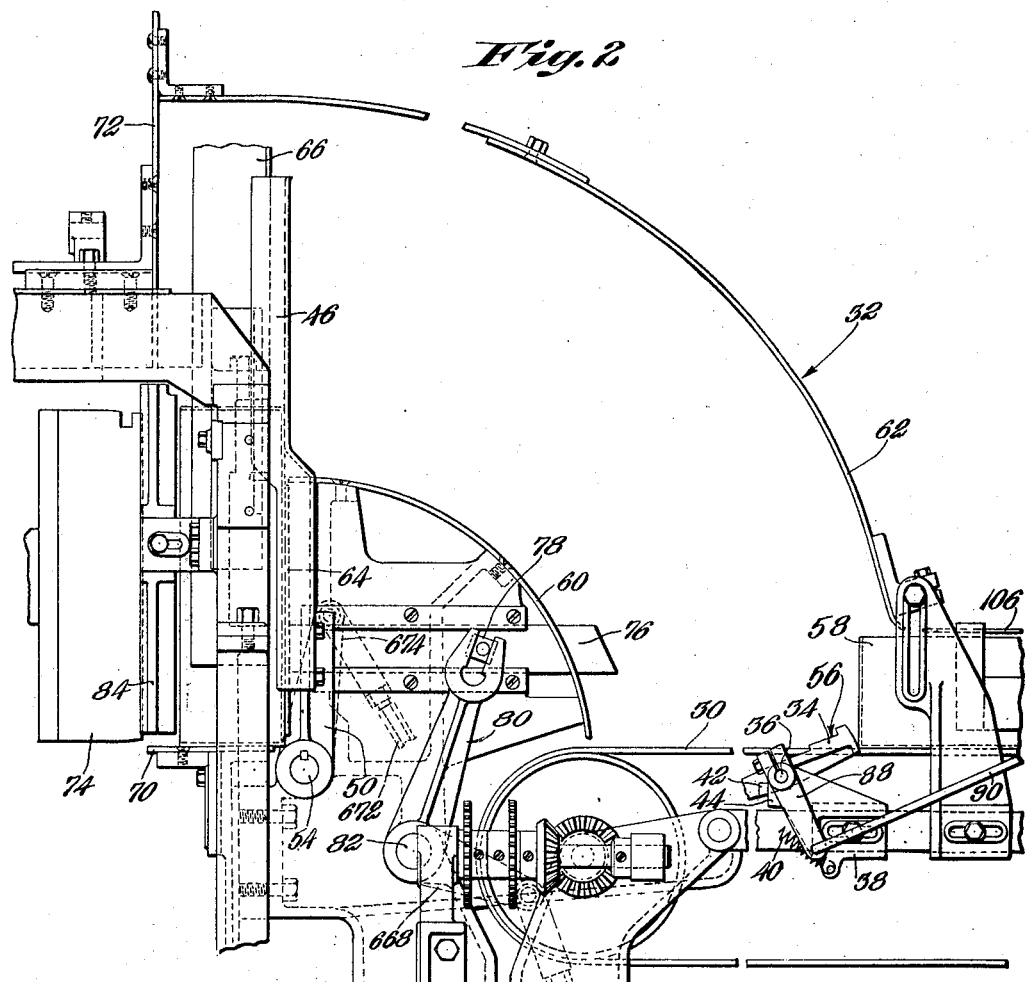
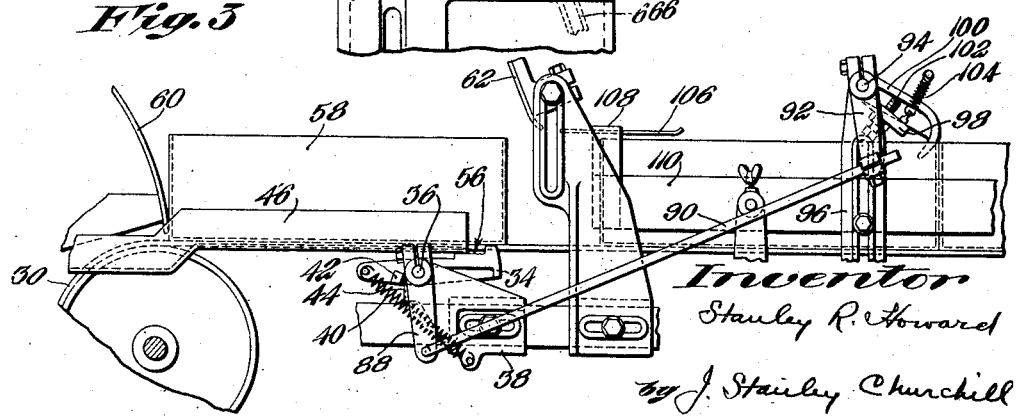

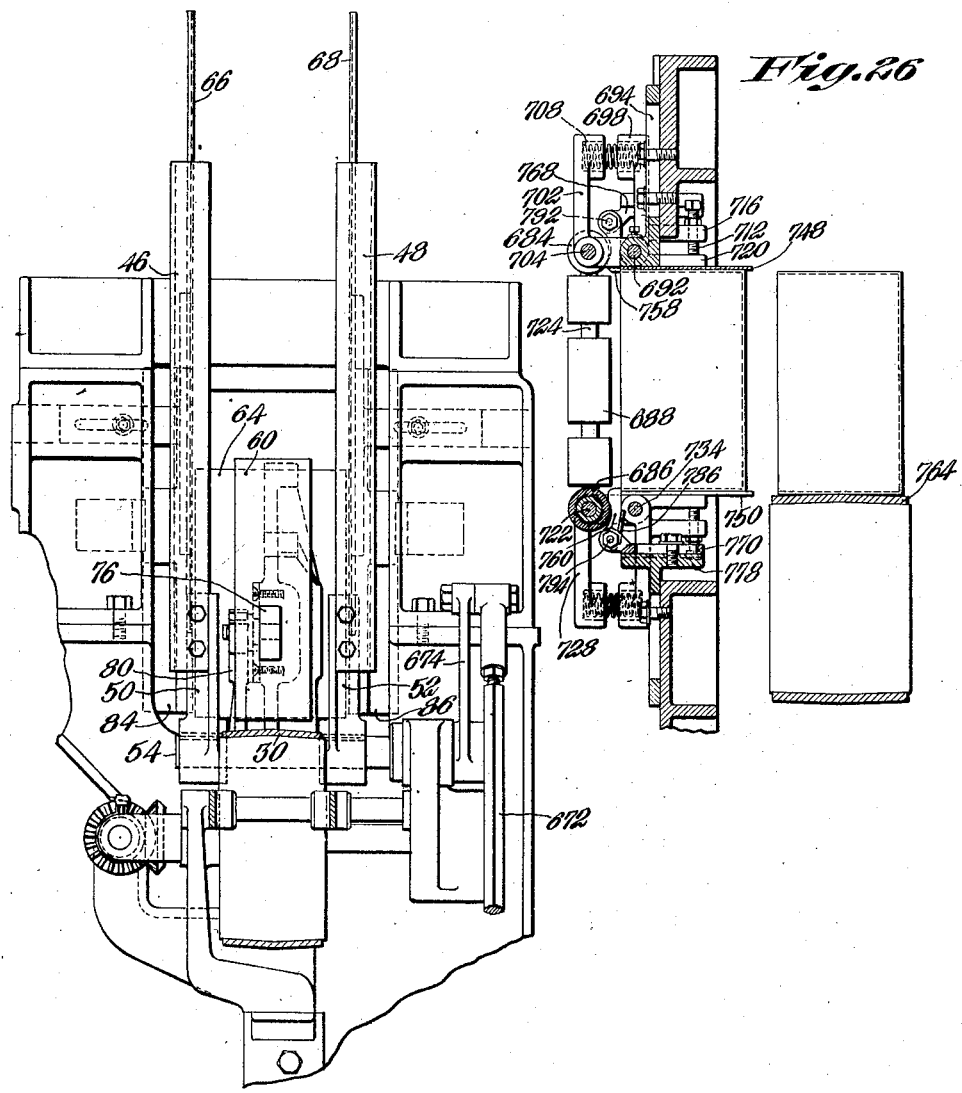

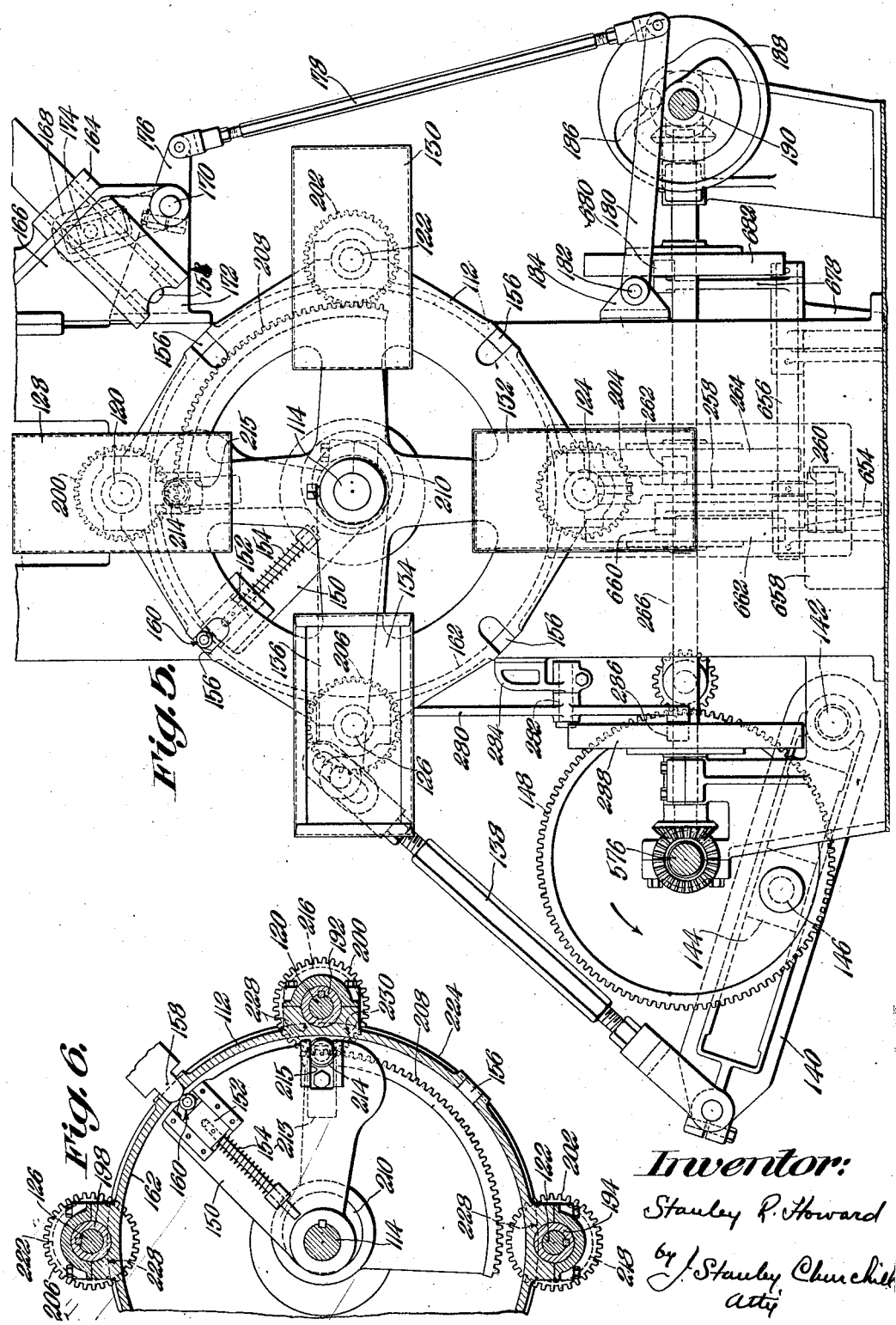

Oct. 8, 1929.  S. R. HOWARD  1,730,613
WRAPPING MACHINE
Filed Jan. 5, 1927  12 Sheets-Sheet 5
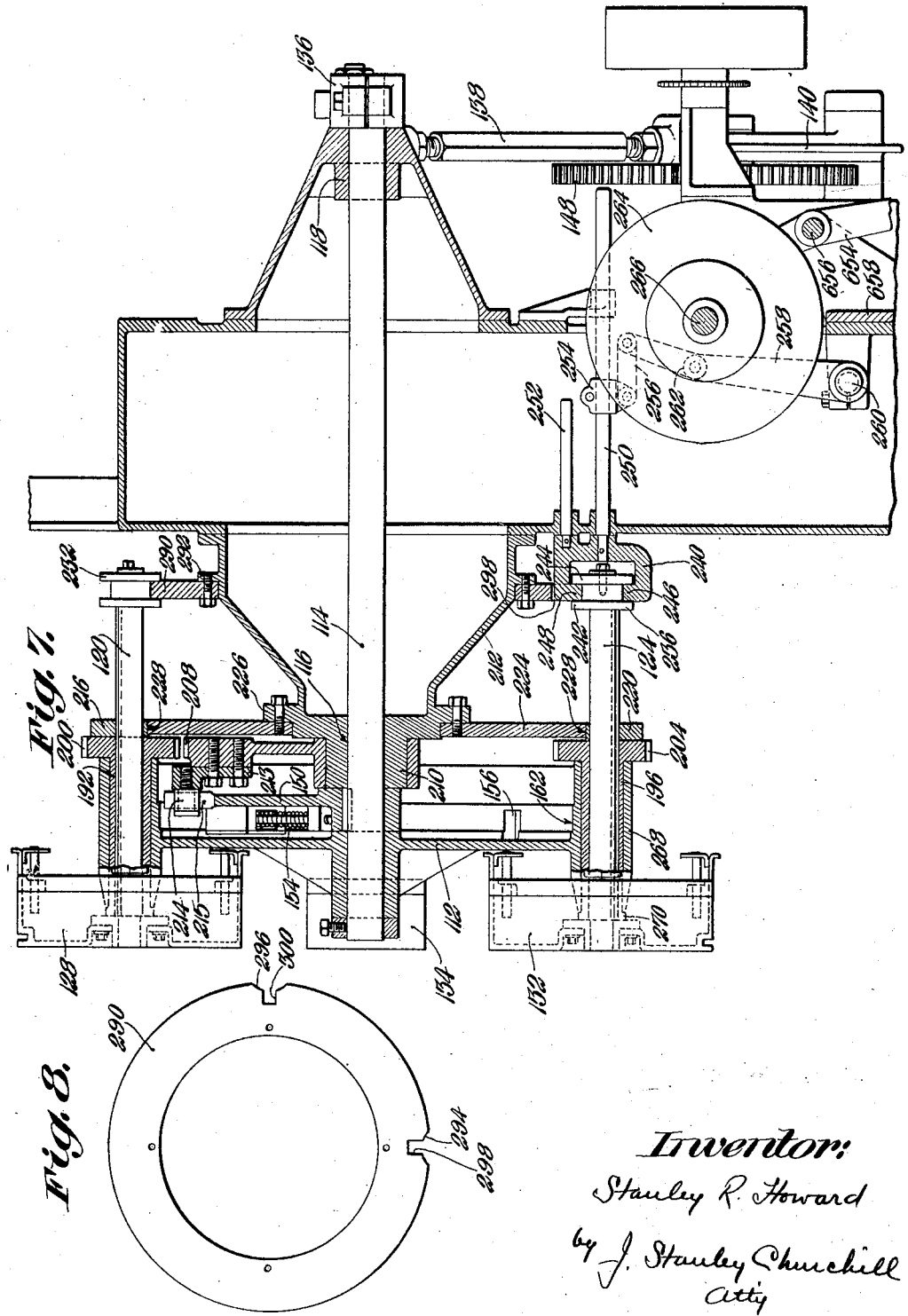

Oct. 8, 1929.                S. R. HOWARD                1,730,613
                           WRAPPING MACHINE
                     Filed Jan. 5, 1927      12 Sheets-Sheet 6
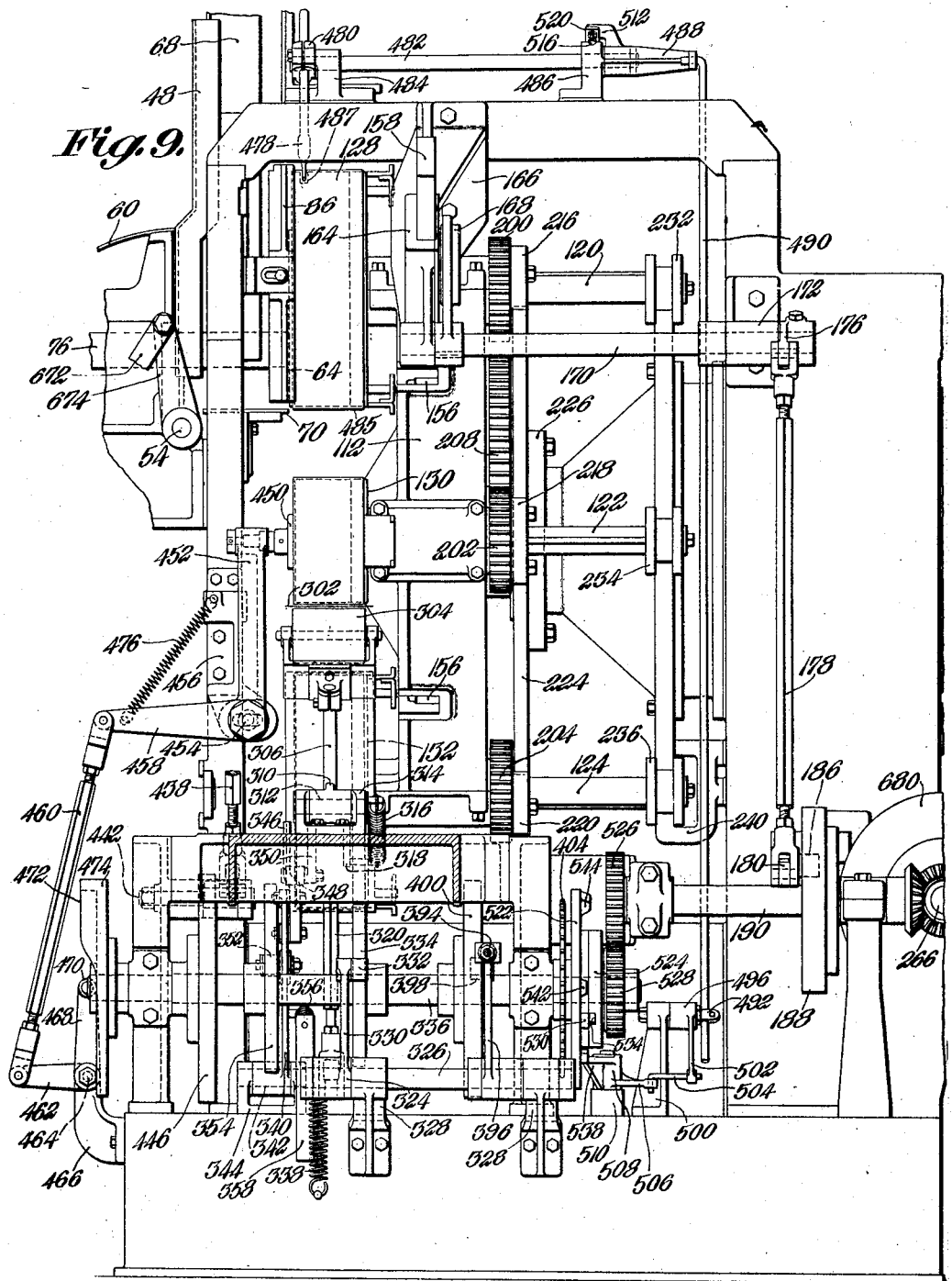

Oct. 8, 1929.   S. R. HOWARD   1,730,613
WRAPPING MACHINE
Filed Jan. 5, 1927   12 Sheets-Sheet 7
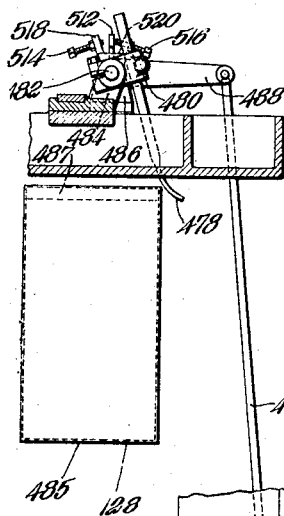
Fig. 10.
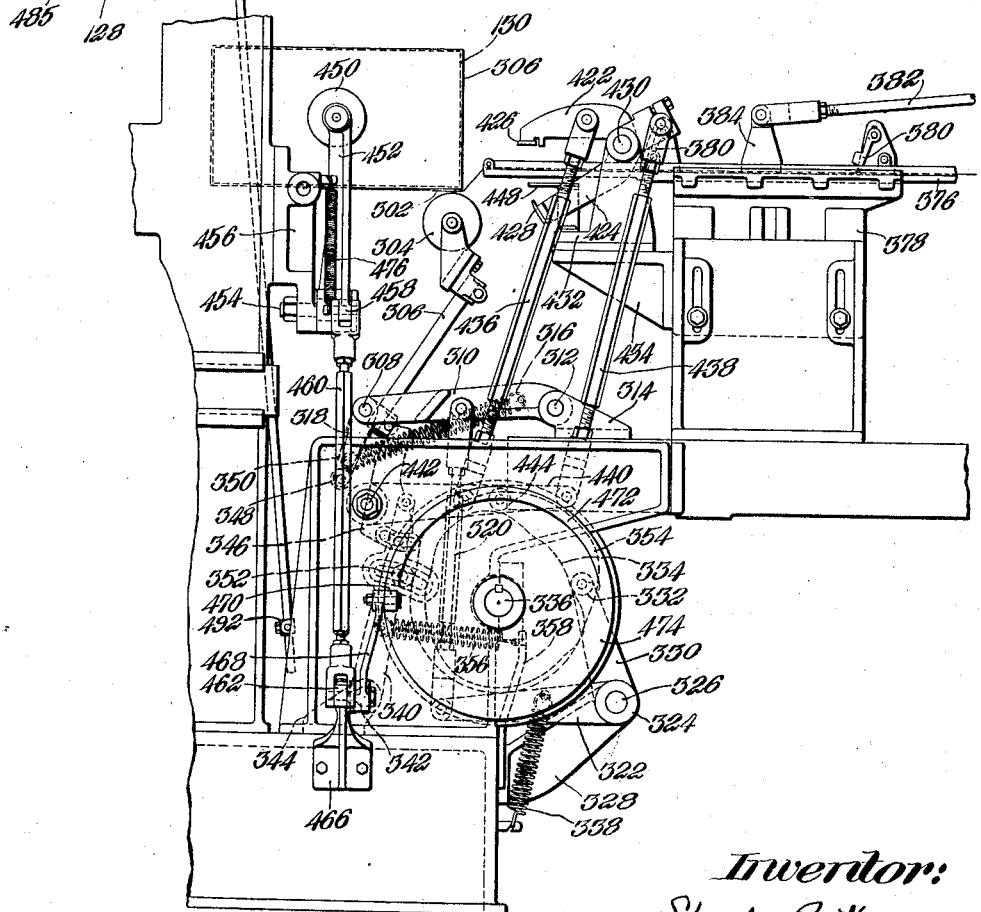
Inventor:
Stanley R. Howard
by J. Stanley Churchill
atty.

Oct. 8, 1929.  S. R. HOWARD  1,730,613
WRAPPING MACHINE
Filed Jan. 5, 1927   12 Sheets-Sheet 8
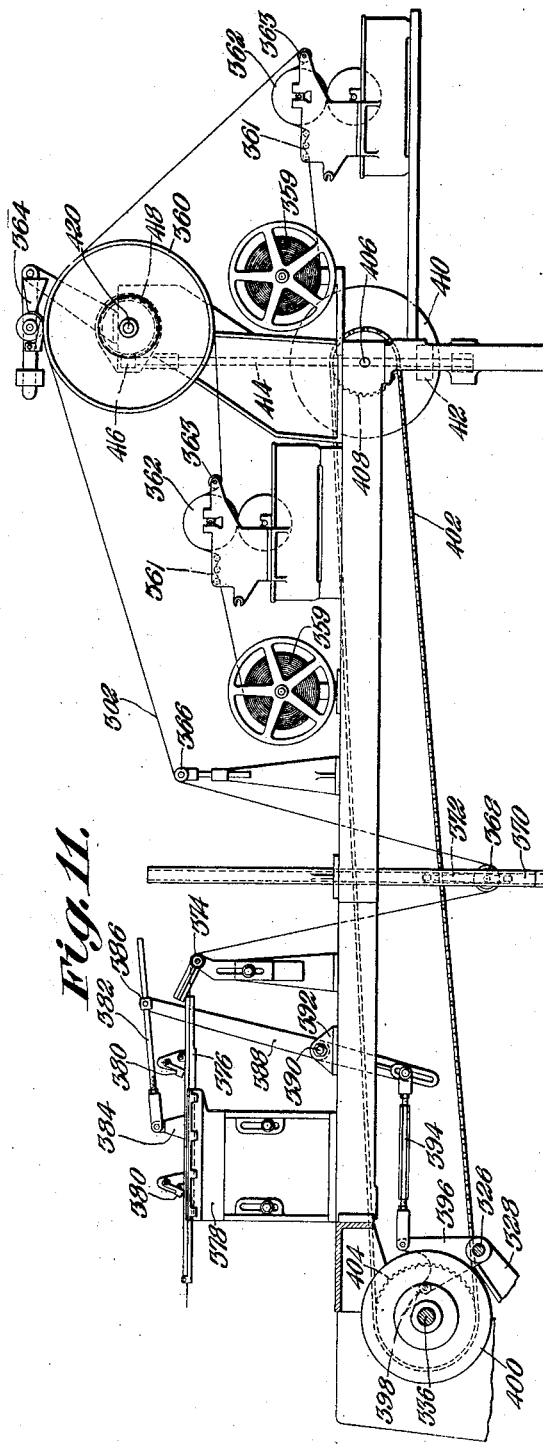
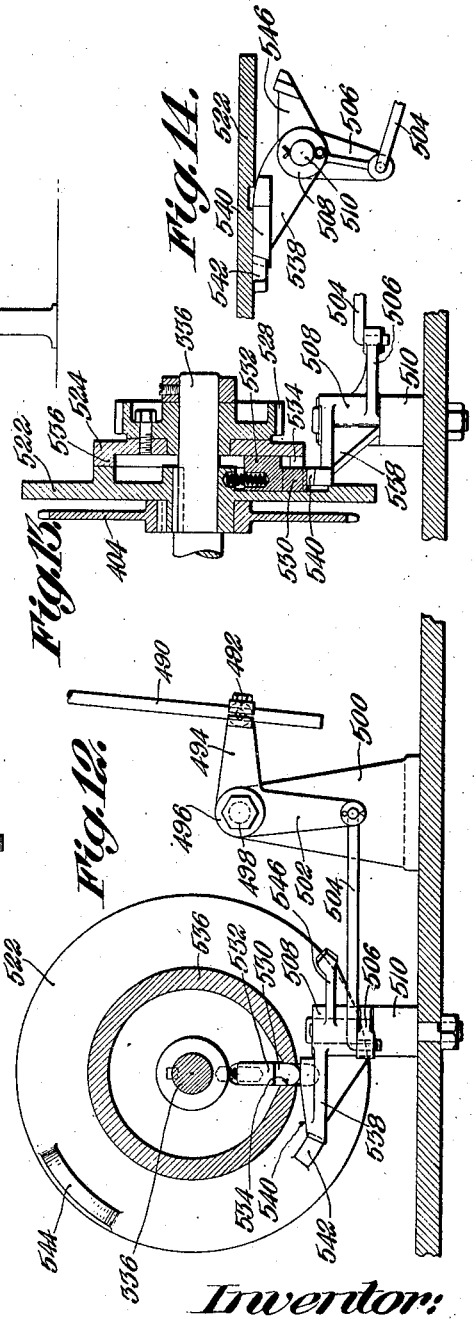
Inventor:
Stanley R. Howard
by J. Stanley Churchill
Atty.

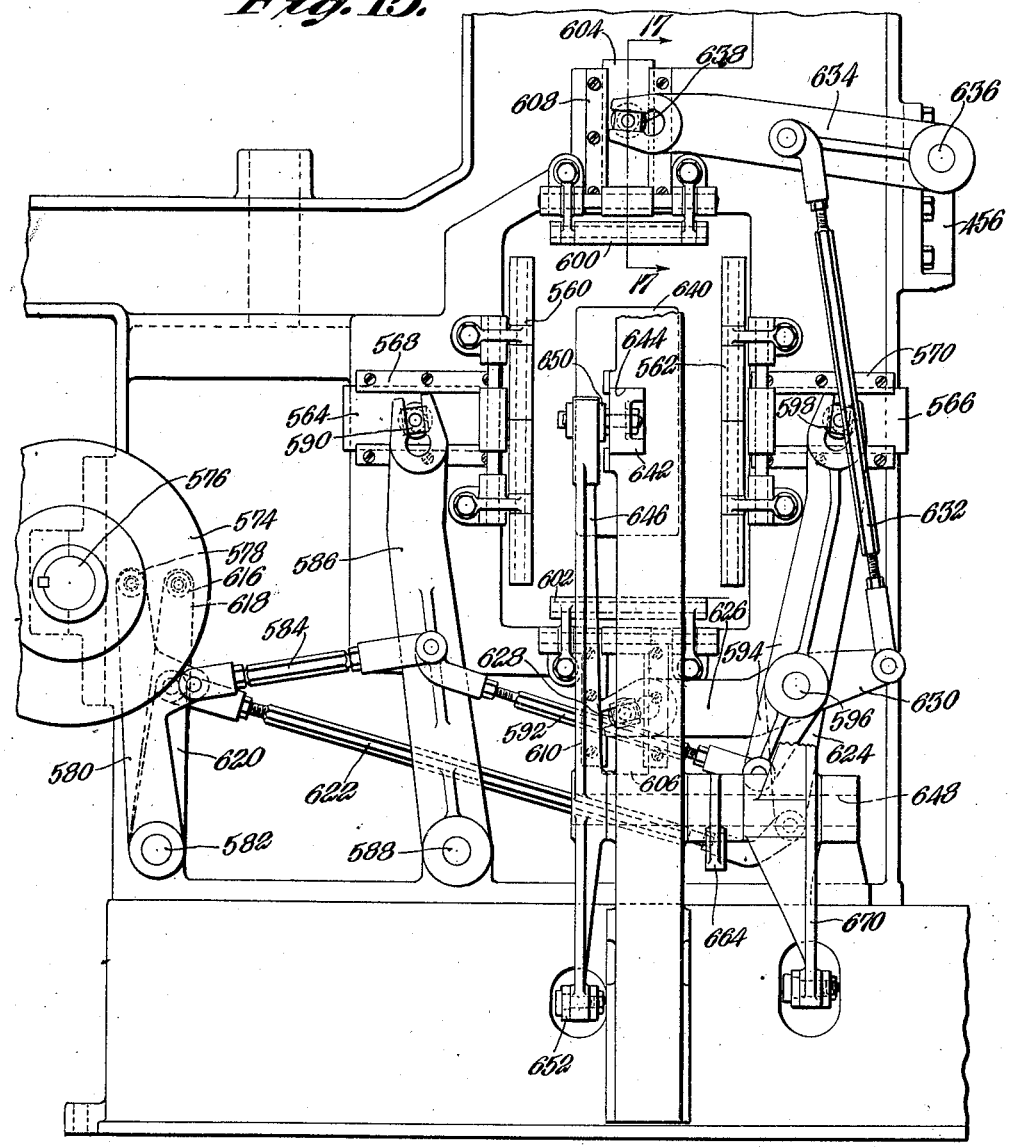

Oct. 8, 1929.  S. R. HOWARD  1,730,613
WRAPPING MACHINE
Filed Jan. 5, 1927   12 Sheets-Sheet 10
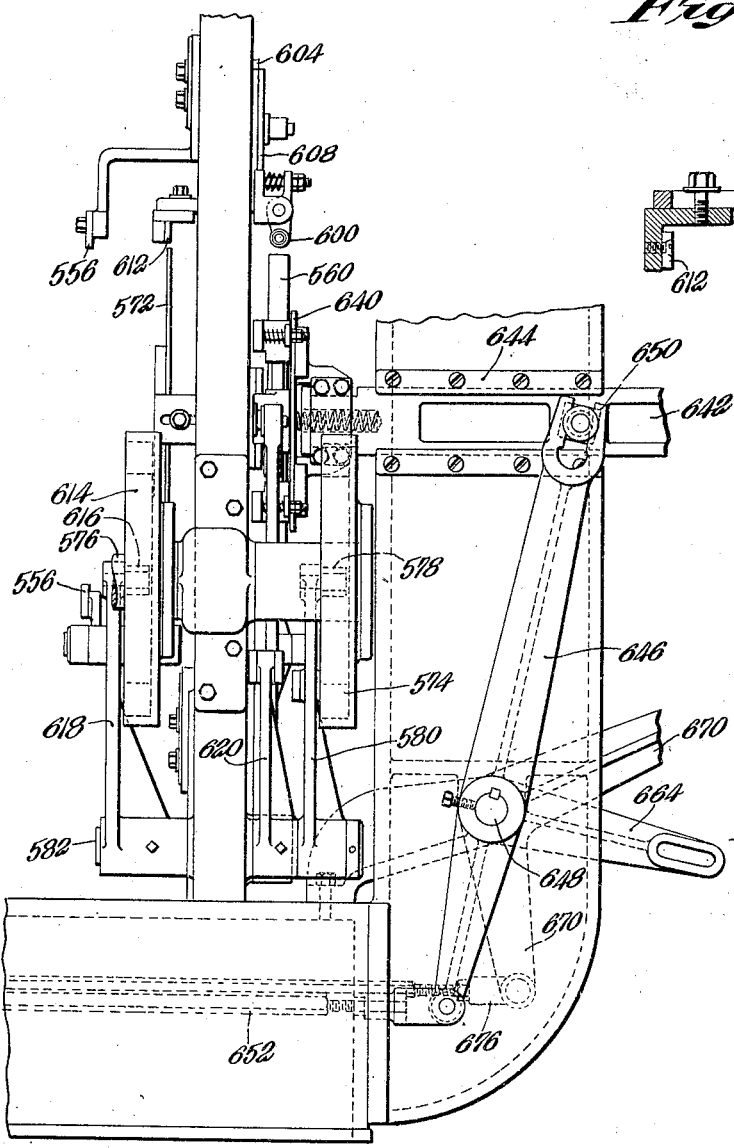
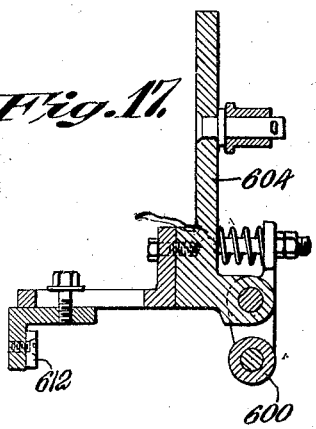
Inventor
Stanley R. Howard
by J. Stanley Churchill
Attorney.

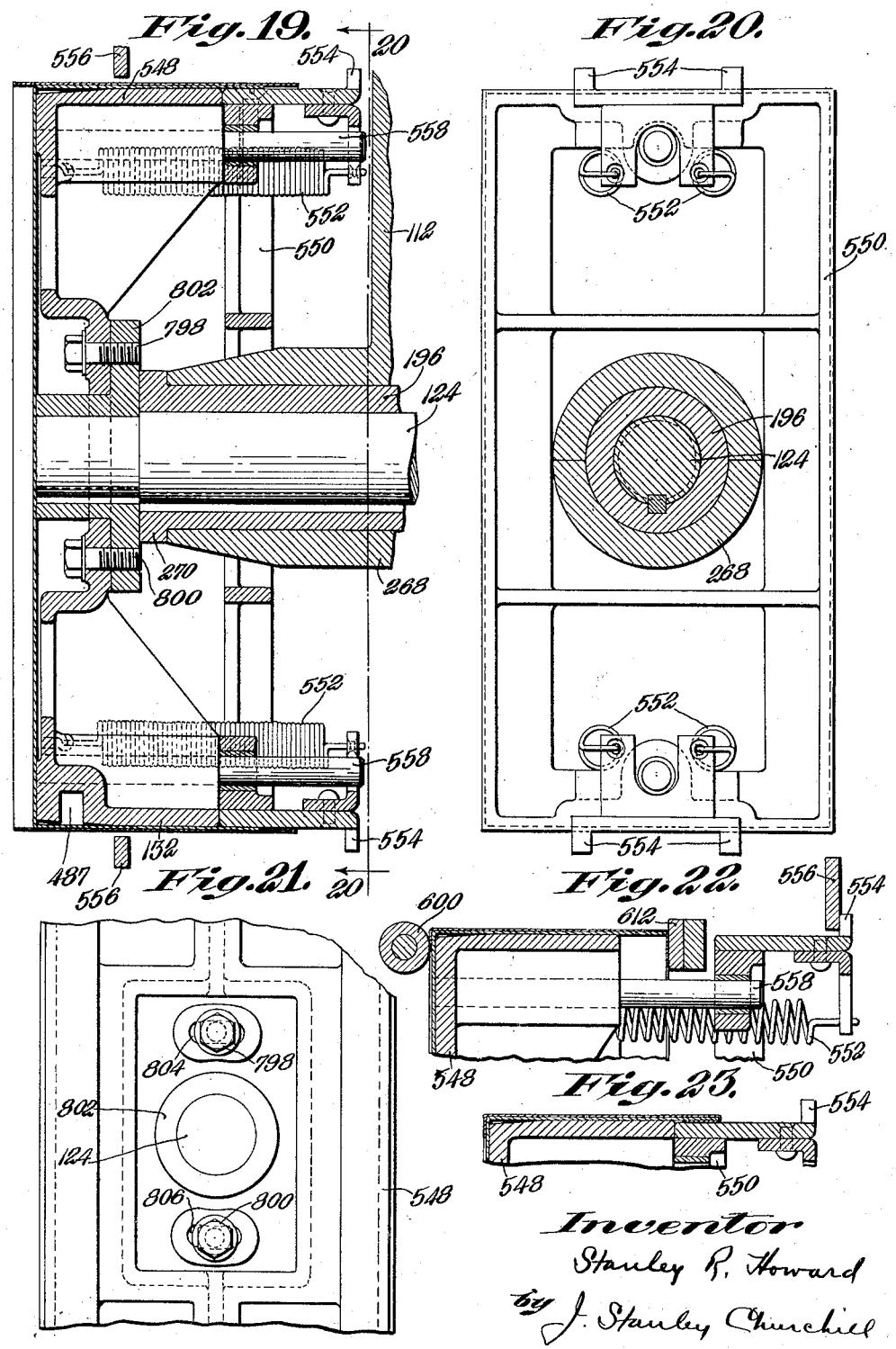

Oct. 8, 1929.  S. R. HOWARD  1,730,613
WRAPPING MACHINE
Filed Jan. 5, 1927   12 Sheets-Sheet 12

Inventor
Stanley R. Howard
by J. Stanley Churchill
Attorney

Patented Oct. 8, 1929

1,730,613

UNITED STATES PATENT OFFICE

STANLEY R. HOWARD, OF EAST MILTON, MASSACHUSETTS, ASSIGNOR TO PNEUMATIC SCALE CORPORATION, LIMITED, OF QUINCY, MASSACHUSETTS, A CORPORATION OF MASSACHUSETTS

WRAPPING MACHINE

Application filed January 5, 1927. Serial No. 159,100.

This invention relates to wrapping machines and more particularly to a box banding machine.

The object of the invention is to provide a novel and improved construction of box wrapping machine and particularly a box banding machine which is adapted to wrap and band boxes, such as shoe boxes, rapidly, economically and in a highly efficient manner.

The particular features of the invention will be hereinafter described and particularly pointed out in the claims at the end of the specification.

Figure 1:
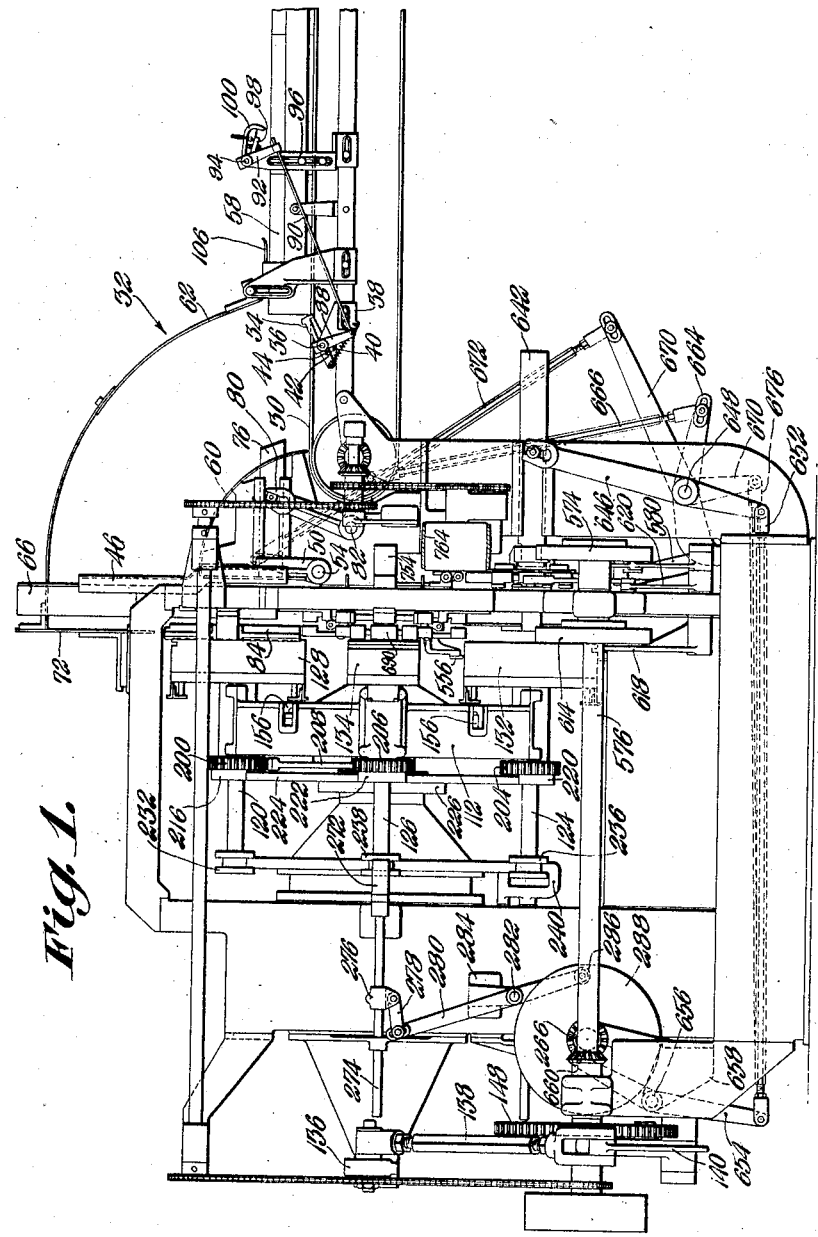
Figure 24:
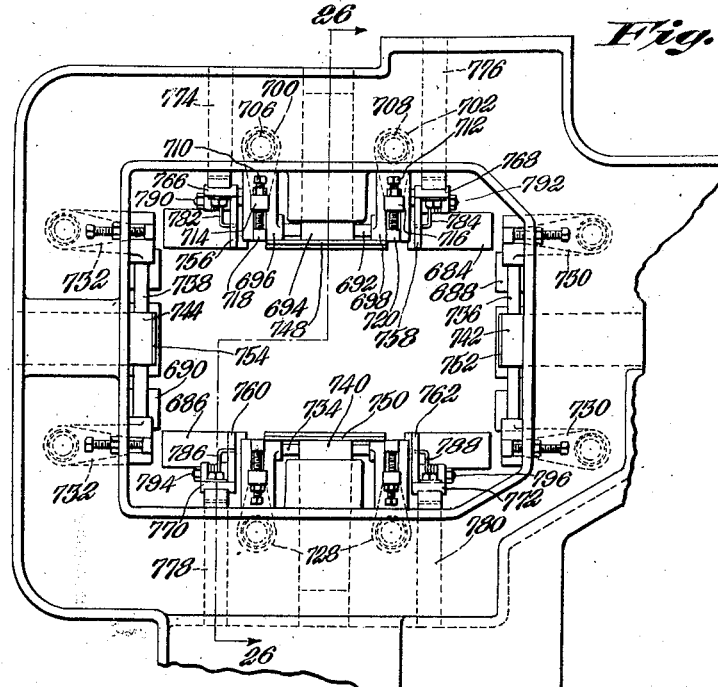
Figure 25:
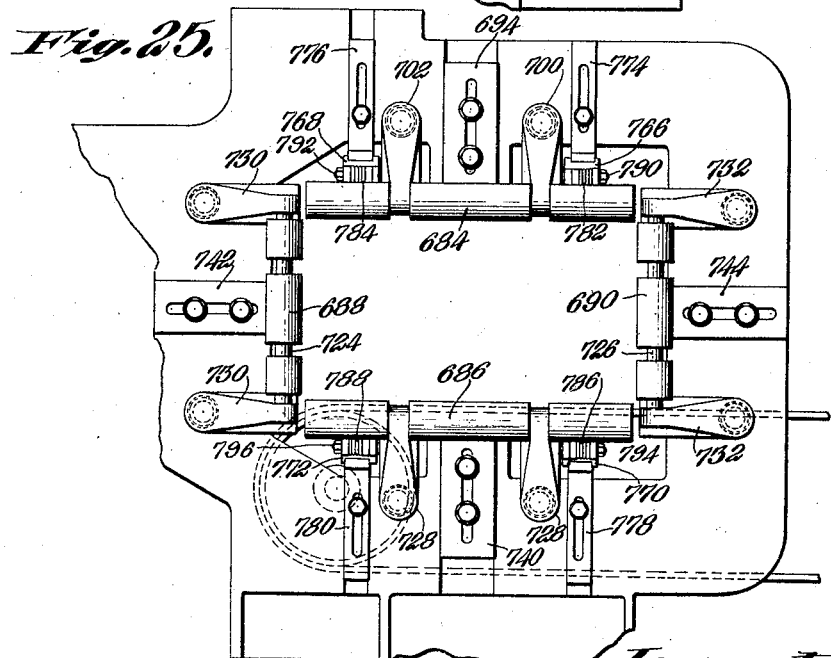

In the drawings which illustrate the preferred form of the invention, Figure 1 is a left side elevation of the machine; Fig. 2 is a left side elevation of the transfer mechanism; Fig. 3 is a similar view with some of the parts in a different position; Fig. 4 is a front elevation of the transfer mechanism; Fig. 5 is a front elevation of the spider and blocks, also showing the mechanism for intermittently rotating the same; Fig. 6 is a somewhat similar view, in section, showing the position of the parts after the spider has been rotated 90 degrees; Fig. 7 is a vertical section through the spider; Fig. 8 is a detail to be referred to; Fig. 9 is a right side elevation, partly in section, of the spider and adjacent parts of the machine; Fig. 10 is a front elevation of a portion of the machine showing particularly the banding station and a portion of the paper feed mechanism; Fig. 11 is a view similar to Fig. 10 showing the paper feed mechanism; Fig. 12 is an elevation partly in section of the paper feed clutch viewed from the rear; Fig. 13 is a vertical section through the same; Fig. 14 is a plan view of the paper feed clutch lever; Fig. 15 is a front elevation of the folding mechanism; Fig. 16 is a side elevation of the same; Fig. 17 is a section taken on the line 17—17 of Fig. 15; Fig. 18 is a perspective view of one of the arms upon which the folding rolls are mounted; Fig. 19 is a longitudinal section through one of the blocks with a box thereon, after the completion of the banding operation; Fig. 20 is a section on the line 20—20 of Fig. 19 with the box and banding sheet omitted; Fig. 21 is a partial front elevation of a block; Fig. 22 is a fragmentary section similar to Fig. 19 showing one overhanging portion of the banding sheet folded down on the bottom of the box and the other turned in at right angles across the top edge of the box; Fig. 23 is a similar view showing the last named portion of the banding sheet folded inwardly about the front edge of the box and upon a portion of the inside of the box; Figs. 24 and 25 are front and rear elevations, respectively, of the pressing and delivery mechanism; and Fig. 26 is a section on line 26—26 of Fig. 24.

In the preferred embodiment of the invention, the machine is provided with a rotatable spider provided at its forward end with four blocks spaced 90 degrees apart upon which the boxes are carried during the banding operation. Provision is made for intermittently rotating the spider, step by step, 90 degrees at a time, so as to present each of these blocks successively to a receiving station, where a box to be banded is placed upon the spider, then to a banding station where a strip of banding paper previously coated with an adhesive is wrapped completely about the sides and ends of the box so that it overhangs the top and bottom edges of the same, then to a folding station where these overhanging portions are folded over upon the bottom of the box and over the top edges thereof and then to a pressing and delivery station at which the previously banded box, upon its block, is pushed through a set of yielding presser rolls which act to more firmly fix the wrapper to the box. The box is delivered onto a table or shelf, being retained upon this shelf by suitable strippers as the block retracts, and thereafter being pushed onto a constantly driven discharge conveyor placed adjacent said shelf by the next box delivered upon the shelf.

The boxes to be banded are preferably delivered to the machine on a constantly driven delivery conveyor, from which one of them is transferred at the receiving station to each of successive blocks by a transfer mechanism, and in the event that no box is placed upon a block at this station, provision is made for operating a safety device to render the paper feed inoperative, to thereby prevent the wrapping of the banding paper about the block.

Referring to the drawings, the boxes to be banded, usually of rectangular shape, are delivered to the banding machine by the constantly moving conveyor shown at 30, (Figs. 1, 2, 3 and 4) and may in the practical operation of the machine be placed on this conveyor by a setting up machine in which they have been previously formed. The conveyor 30 delivers the boxes with their top or open sides uppermost, to the transfer mechanism, indicated generally at 32. Each box, as it is delivered to the transfer mechanism, engages the front end of a stop arm 34 located at one side of the conveyor 30. This stop arm is secured to a shaft 36 pivotally mounted in a fixed bracket 38 and is normally held in the position shown in Figs. 1 and 2 by a spring 40 connected between a pin on the rear end of the arm 34 and one on the bracket 38, the movement of the arm 34 being limited by the engagement of an abutment 42 thereon with an abutment 44 on the bracket.

In order to transfer each incoming box, in turn, from the delivery conveyor to one of the box holding blocks on the spider, a pair of transfer arms 46 and 48 are provided. These arms are mounted on brackets 50 and 52 secured to a rock shaft 54. This shaft is rocked in timed relation to the other parts of the machine in a manner hereafter to be described, so as to swing the arms 46 and 48 from the position shown in Fig. 3 to that shown in Fig. 2. The conveyor 30 is of a width somewhat less than that of the boxes to be banded, and as the arms 46 and 48 which are of L-shaped cross-section swing from the position shown in Fig. 2 to that shown in Fig. 3, the end of the arm 46 engages a surface 56 on the stop arm 34 and swings the latter from the position shown in Fig. 2 to that shown in Fig. 3. This movement of the arm 34 brings its front end below the top of the conveyor and allows the first incoming box, indicated at 58, to be fed into the transfer mechanism until it engages the end of a bottom guide plate 60. In moving into this position the incoming box assumes a position just over the bottom faces of arms 46 and 48 and between their side faces so that as these arms are swung from the position shown in Fig. 3 to that of Fig. 2, they swing the box with them between the bottom guide 60 and a top guide shown at 62 until it drops off the end of the bottom guide 60 in front of a pusher plate 64 and between guides 66 and 68 onto a table 70. A stop plate 72 prevents the box being moved too far by the arms. In order to transfer the box from its position on the table 70 to a block at the receiving station indicated at 74 in Fig. 2, the pusher plate 64 is mounted on the end of a slide 76 adapted to be reciprocated by means of a block 78 pivoted thereon by an arm 80 secured to a rock shaft 82 pivotally mounted in the frame of the machine. Guide plates 84 and 86 are provided to position the box laterally during this operation.

In order that the first incoming box on the conveyor 30 may be free to be swung upwardly by the arms 46 and 48, provision is made for stopping the second incoming box when the first box moves into its position above and between these arms. To this end an arm 88 is secured to the shaft 36 and has its outer end connected by a link 90 to the outer end of a similar arm 92 secured to a shaft 94 pivotally mounted in a bracket 96. The shaft 94 also has fixed to it an arm 98 and has pivotally mounted on it a stop arm 100 which is normally held in engagement with an adjustable stop 102 on the arm 98 by a spring 104 connected between a pin on the arm 98 and one on the arm 100. From this description it may readily be seen that as the stop arm 34 is depressed by the arm 46, the arm 88 and also the arms 98 and 100 will be rocked, and the end of the arm 100 will be moved into the path of the rear end of the second incoming box, as shown in Fig. 3. If, however, the end of the arm 100 should descend directly upon the edge of a box the spring 104 yields and prevents injury to the box. To prevent the front end of the incoming boxes from being raised while engaged by the stop arms 34 or 100, stop plates 106 are provided which are mounted on brackets 108 secured to the guides 110 which position the boxes on the conveyor 30.

The spider provided to successively carry the box carrying blocks from the receiving station to the banding, the folding, and the pressing and stripping stations, is best shown in Figs. 1, 5, 6, 7 and 9, being indicated at 112 therein, and is pivotally mounted on the forward end of a shaft 114 journalled at 116 and 118 in bearings secured to the frame of the machine. The spider has rotatably and slidably mounted at intervals of 90 degrees on its periphery, the shafts 120, 122, 124 and 126, which shafts carry on their forward ends the blocks 128, 130, 132 and 134, respectively. In these figures the block 128 is shown at the receiving station, 130 at the banding station, 132 at the folding station, and 134 at the pressing and delivery station.

For the purpose of intermittently rotating the spider, to move each of these blocks successively through each of these stations, an arm 136 is secured to the rear end of the shaft 114. This arm is connected by a link 138 to the outer end of a crank arm 140 pivoted at 142 to the frame of the machine. The crank arm 140 is rocked by a block 144 pivotally mounted on a crank pin 146 secured to a gear 148. The length of the link 138 is adjustable and also the effective length of the arm 136, and these lengths may be adjusted so as to rock the shaft 114 exactly 90 degrees each time the crank arm 140 is rocked. In order that the spider 112 may be rotated 90 degrees in a clockwise direction (as seen in Figs. 5 and 6) each time the shaft 114 is rocked in that direction, a latch arm 150 is secured to the shaft 114 within the spider 112 with its hub adjacent that of the spider. This latch arm has a radially disposed latch 152 mounted in a slide therein which is urged outwardly by a spring 154. This latch cooperates with successively a series of four peripheral slots 156 in the spider 112 to connect the spider and latch arm 150 and to thereby rock the spider in a clockwise direction upon similar movement of the shaft 114 and latch arm 150. In order to permit the latch arm 150 to be returned independently of the spider when counter clockwise rotation of the shaft 114 takes place, provision is made for disengaging the latch 152 from the particular slot 156 in which it was received during the preceding forward part of oscillation of the shaft 114 and the spider, and in addition provision is also preferably made for locking the spider in the position into which it has been advanced by the forward oscillation of the latch arm 150. In the illustrated machine, as shown in detail in Fig. 6, a radially movable lock 158 located externally of the spider is arranged to be inserted by mechanism to be described, into the particular slot 156 with which the latch 152 is engaged during the forward movement of the latch arm 150, disengaging the latch 152 from the spider and permitting the latch arm 150 to be free to rotate in a counter-clockwise direction with the shaft 114. At the same time the lock 158 serves to prevent return movement of the spider in a counter-clockwise direction. During the counter-clockwise rotation of the latch arm 150, a roll 160 journalled in the outer end of the latch 152 rides upon the inner cylindrical surface 162 of the spider until the latch, at the end of this movement, comes into alinement with another of the slots 156 and is forced into it by the spring 154, the parts then being again in the position shown in Figs. 5 and 7. In order that the lock 158 may be inserted at the proper time into one of the slots in the spider 112 to lock the latter against counter-clockwise rotation and later withdrawn at the proper time to permit clockwise rotation of the spider, the lock 158 is mounted in slideways 164 formed in a bracket 166 secured to the frame of the machine and is moved therein by means of an arm 168 secured to a rock shaft 170 journalled in the bracket 166 and another fixed bracket 172 and connected to the lock 158 by a pivoted block 174. The shaft 170 is rocked by an arm 176 secured to its rear end and connected by a link 178 to the outer end of a cam arm 180 mounted on a stud 182 secured to a bracket 184 secured to the frame of the machine. The cam arm 180 carries a cam roll 186 which cooperates with a suitably shaped cam groove in a cam 188 secured to a constantly rotating shaft 190 to impart the desired timed movement to the lock 158 through the connections described.

In the operation of the machine a set up box to be banded is preferably automatically placed upon the particular block at the receiving station by means including mechanism for actuating the slide 76 and pusher plate 64 carried thereby, and thereafter the block with the box thereon is advanced to the banding station in the manner and by the mechanism just described. The banding station is illustrated by the position occupied by the block 130 in Fig. 5, and after the particular block bearing the box to be banded arrives at the banding station, provision is made in the illustrated machine for rotating the block through one revolution and for holding an adhesive banding strip or sheet against the lateral surface of the box being thus revolved to thereby wrap the banding strip around the box.

Referring to Figs. 1 and 9, the actuating mechanism for the slide 76 and pusher plate 64 comprises an arm 664 secured to the rock shaft 648 to which is pivoted one end of a link 666, the other end of which is pivoted to an arm 668 secured to the rock shaft 82, which also has secured to it the arm 80 for reciprocating the slide 76. A bell crank lever 670 is loosely mounted on the shaft 648 to whose upper end is pivoted a link 672 pivoted at its upper end to an arm 674 secured to the rock shaft 54 upon which the brackets 50 and 52 carrying the transfer arms 46 and 48 are mounted. The lower end of the bell crank lever 670 has pivoted to it the forward end of a long link 676 whose rear end is pivoted on the lower end of a cam arm 678 mounted on the shaft 656 and carrying on its upper end the cam roll 680 which engages a cam groove in a cam 682 secured to the shaft 266.

The mechanism for selectively rotating each of the blocks 128, 130, 132 and 134 after it has arrived at the banding station in order that the wrapper may be wrapped about the box may be described in detail as follows: The shafts 120, 122, 124 and 126, upon which the blocks are mounted, have splined to them sleeves 192, 194, 196 and 198 respectively, having formed on their rear ends gears 200, 202, 204 and 206. A segmental gear 208 which meshes with these gears 200, 202, 204 and 206 while at the banding station, is rotatably mounted on a fixed bearing 210 (see Fig. 6), eccentric with respect to the shaft 114, and formed on the forward end of a conical shell 212, (see Fig. 7,) secured to the frame; the shell 212 also carries the bearing 116 for the shaft 114. The segmental gear 208 has secured to the outer portion of its front face a bracket 213 which carries a roll 214 which engages the sides of a radial slot 215 formed in the periphery of the arm 150, thus connecting the latch arm 150 and the segmental gear 208 in such a manner that when the latch arm is rotated 90 degrees in either direction with the rock shaft 114 the segment 208 is rotated slightly more than 90 degrees in the same direction upon its eccentric bearing 210. It may be seen from an inspection of Figs. 5 and 6 that the eccentricity of the bearing 210 with respect to the shaft 114 is in such a direction as to cause the teeth of the segment 208 to mesh with any one of the gears 200, 202, 204 or 206 located at the banding station and prevent engagement with any of them at any of the other three stations. During the clockwise rotation of the spider 112, the latch arm 150 and segment 208 will be moved from the position shown in Fig. 5 to that shown in Fig. 6, and the block 130 will be moved from the banding station to the folding station. During this movement the teeth of the gear 202 will gradually move out of mesh with the teeth of the segment 208. At the same time the block 128 will be moved from the receiving station to the banding station, and the teeth of its gear 200 will be gradually brought into mesh with those of the segment 208 and will be wholly in mesh when the parts reach the position shown in Fig. 6. During this movement neither of the gears 200 and 202 are rotated about their own axes 120 and 122. When, however, the latch arm 150 and segment 208 rotate in a counter-clockwise direction and the spider is prevented from such rotation by the lock 158, the engagement of the teeth of the segment with those of the gear 200 will cause the latter and the block 128 to be rotated in a clockwise direction. The pitch radii of the segment 208 and gear 200 are preferably so proportioned that this rotation of slightly more than 90 degrees of the segment will rotate the gear and block exactly one revolution as is desired.

In order that the blocks 128, 130, 132 and 134 may be prevented from rotating at all times excepting while at the banding station, as above described, the gears 200, 202, 204 and 206 have secured to them shoes 216, 218, 220 and 222 arranged to ride upon the periphery of a circular disk 224 secured to a flange 226 formed on the shell 212, the shoes having concave faces 228 closely fitting this periphery. A recess 230 is formed in the disk 224 opposite the banding station of a size sufficient to permit the shoes 216, 218, 220 and 222 to rotate within the same. During the operation of the machines, a box upon each of the blocks 128, 130, 132 and 134 is banded during the interval that the particular block remains at the banding station, and the banding operation is performed by banding mechanism indicated generally at 251, and whose operation will be hereafter described in detail.

After the box upon one of the blocks has had the banding strip wrapped around it, then the spider operates to move the box and block to the folding station wherein the projecting portions of the banding strip are folded over the upper edges of the box and over and upon the bottom of the box. The position of the partially banded box upon its block when arriving at the folding station is illustrated in Fig. 19, and in order that the folding operations may be performed, provision is made for moving the block in a direction lengthwise of its shaft and into a position to be operated upon by folding rolls 560, 562, 600 and 602. To this end the shafts 120, 122, 124 and 126 have secured to their rear ends the doubly flanged collars 232, 234, 236 and 238, respectively, arranged to come into engagement with a dog 240 when the spider moves the particular block to the folding station. In Fig. 7 the flanges 242 and 244 of the collar 236 on the shaft 124 are shown in such engagement with the inwardly disposed lugs 246 and 248 on the dog 240. The dog 240 is secured to the forward end of a rod 250 slidably mounted in the frame of the machine. Another rod 252 secured to the dog 240 is similarly mounted, and prevents rotation of the dog 240. Adjustably clamped to the rod 250 is a collar 254 to which is pivoted one end of a link 256. The other end of this link is pivoted to the upper end of a cam arm 258 pivoted at 260 to the frame of the machine. This cam arm has mounted upon it a cam roll 262 which engages a cam groove in a cam 264 secured to a driven shaft 266. The groove in the cam 264 is of such shape as to move the shaft 124 and block 132, through the connections described, to the left from the position shown in Fig. 7 or 19, into folding position such as is illustrated in Fig. 22 at the proper time and to return it to the starting position after the folding operation. During this movement the shaft 124 slides in the sleeve 196, (see Figs. 7 and 19), and the latter is prevented from movement in its bearing 268 by the gear 204 at its rear end and a flange 270 at its forward end.

In order to assist in the folding of the portions of the wrapper projecting beyond the upper edges of the box 7, each of the blocks is preferably made in two sections 548 and 550 normally held together in the position shown in Fig. 19 by springs 552 but adapted to be separated against the pressure of these springs in the manner illustrated in Fig. 22, when during the longitudinal movement of the block as above described, lugs 554 on the section 550 are engaged by fixed stops 556 and as the section 548 continued to be moved, the sections are separated. In order that the section 550 may be separated from the section 548 in the manner described, it is slidably mounted on studs 558 projecting rearwardly from the section 548.

When the opened block having a banded box thereon arrives in folding position such as is illustrated in Fig. 22, the portions of the wrapper overhanging the longer sides thereof are folded down on the bottom of the box by two sets of oppositely disposed folding rolls 560 and 562 which are yieldingly mounted on the inner ends of slides 564 and 566 slidably mounted in slideways 568 and 570 secured to the frame. At the same time the portions of the wrapper overhanging the top edges of these sides will be folded down at right angles across these edges by two oppositely disposed folding plates 572 adjustably secured to the slides 564 and 566.

In order to impart to the slides 564 and 566 the movement necessary for these folding operations and to return them to starting position after the performance of these operations, a cam 574 is secured to the shaft 576 to which is also secured the gear 148. A cam groove in this cam engages a cam roll 578 on the upper end of a cam lever 580 loosely mounted on a rock shaft 582 journalled on the frame of the machine and connected by a link 584 to a rock lever 586 whose lower end is pivoted at 588 to the frame and which engages at its upper end a block 590 pivotally secured to the slide 564. The rock lever 586 is connected by a link 592 to the lower end of a rock lever 594 pivoted to the frame at 596 and engaging at its upper end a block 598 pivotally secured to the slide 566.

After the folding operation has been performed, as described, on the longer sides of the box and the folding rolls and plates which performed it have been withdrawn to their starting positions by the mechanism described, the portions of the wrapper overhanging the shorter sides of the box are similarly folded down on the bottom of the box by oppositely disposed folding rolls 600 and 602 yieldingly mounted on the inner ends of slides 604 and 606 slidably mounted in slideways 608 and 610 which also have adjustably secured to them the folding plates 612 for folding down at right angles across the top edges of these sides, the portions of the wrapper overhanging these edges.

In order that the slides 604 and 606 may be moved inwardly to perform these folding operations and withdrawn after their completion, a cam 614 is secured to the shaft 576 in which is formed a cam groove which engages a cam roll 616 on the upper end of a cam lever 618 secured to the rock shaft 582. A rock lever 620 is secured at its upper and lower ends to the rock shaft 582 and, by a link 622, to one arm 624 of a three arm lever pivotally mounted on the stud 596. A second arm 626 of this lever engages at its end a block 628 pivoted to the slide 606 while the third arm 630 of the lever is connected by means of a link 632 to a rock lever 634 pivoted at one end at 636 to the bracket 456 and engaging at its other end a block 638 pivoted to the slide 604.

After the folding operations described have been performed on the shorter sides of the box, the block carrying the box is withdrawn from folding position and during the first part of its return movement as the section 548 of the block returns to position against the section 550 the portion of the wrapper which has been folded down at right angles across the top edges of the box is engaged by the section 550 of the block and folded down upon the inside of the box, as indicated in Fig. 23.

In order to hold the boxes firmly on the blocks during the folding operation, a pusher plate 640 is yieldingly mounted on the inner end of a slide 642 mounted to slide in slideways 644 in the frame of the machine. A rock lever 646 secured to one end of a rock shaft 648 engages at its upper end a block 650 pivotally secured to the slide 642 and at its lower end is connected by means of a long link 652 to the lower end of a cam arm 654 pivoted on a shaft 656 supported in a bracket 658 secured to the frame and carrying on its upper end a cam roll 660 which engages a cam groove formed in a cam 662 secured to the shaft 266. The cam groove in the cam 662 is of such shape as to cause the pusher plate 640 to yieldingly engage the boxes to hold them on their blocks during the time when the overhanging portions of the banding sheet are being folded down on the bottom of the box and at right angles across the top edges of the box, and then to cause the pusher to follow the block on its return movement so as to hold the box on the block while these latter portions of the wrapper are being folded down on the inside of the box, and finally to remove the pusher plate from engagement with the box after the return movement of the block has been completed, so as to allow the block to feed to the pressing and delivery station. After the wrapper has been folded in the manner described and the parts have assumed the position shown in Fig. 23, then the spider is rotated through another step of 90 degrees, thereby moving the block and box from the folding station to the pressing and delivery station, representing the third station in the cycle of revolution of the spider.

The mechanism for moving the block and box through the presser rolls 684, 686, 688 and 690, is herein shown as including the flanged collars 232, 234, 236 and 238 above described and which are engaged by a dog 272 (see Fig. 1), secured to the forward end of a slidably mounted rod 274. Clamped to this rod is a collar 276 to which is pivoted one end of a link 278, the other end of which is pivoted to the upper end of a cam arm 280 pivoted at 282 to a fixed bracket 284 and carrying at its lower end a cam roll 286 which engages a cam groove in a cam 288 secured to the shaft 266. The groove in the cam 288 is of such shape as to move each block with its banded and folded box thereon, through the connections described, into the pressing and delivery station, that is, to the right in Fig. 1, at the proper time, and to return it to the starting position after the pressing and stripping operations are completed.

In order to prevent longitudinal movement of the blocks 128, 130, 132 and 134 at all times other than during the movements above described in connection with the folding and the pressing and delivery operations, a circular disk 290 is secured to a flange 292 of the shell 212 and normally engages the flanges of the collars 232, 234, 236 and 238, as shown in Figs. 1, 7 and 9 to prevent such movement, the collars riding upon the periphery of the disk while the blocks are fed from station to station. To allow the collars to be moved longitudinally at the folding and the pressing and delivery stations, recesses 294 and 296 are formed in the disk 290 and radial slots 298 and 300 are also formed in it to permit the desired movement of the dogs 240 and 272 as shown in Fig. 8.

When a block carrying a box upon which the banding and folding operations have previously been performed arrives at the pressing and delivery station, it is moved longitudinally through the yieldingly mounted presser rolls indicated at 684, 686, 688 and 690 in Figs. 24, 25 and 26, and which serve to roll the paper down and to press it upon the sides and ends of the box and also apply a pressure to the part folded over on the inside of the box.

As herein shown the presser roll 684 is yieldingly mounted by mechanism including a shaft 692 secured to a bracket 694 which is adjustably secured to the frame of the machine. Stop arms 696 are secured to the shaft 692. These arms are formed with forked hubs which straddle the hubs of two L-shaped arms 700 and 702. A shaft 704 is rotatably mounted in the arms 700, 702, and the three sections of the presser roll 684 are secured to the shaft 704. Coiled springs 706 and 708 positioned between sockets formed in the ends of the arms 700 and 702 and sockets in the adjacent ends of the stop arms 696 and 698, tend to force the roll 684 inwardly. The inward movement of the roll 684 is limited by the engagement of stop screws 710 and 712 adjustably secured in lugs 714 and 716 formed on the stop arms 696 and 698, with lugs 718 and 720 formed on the arms 700 and 702. The presser rolls 686, 688 and 690 are yieldingly mounted in a similar manner by means of their shafts 722, 724 and 726, which are rotatably mounted in the arms 728, 730 and 732, respectively, these arms being rotatably mounted on shafts 734, 736 and 738 fixed in brackets 740, 742 and 744 secured to the frame.

After passing through the presser rolls the banded box on its block is carried between guide plates 748, 750, 752 and 754 secured to brackets 694, 700, 742 and 744, respectively. In moving into this position between the guide plates, the box engages the ends of the yieldingly mounted stripper fingers 756, 758, 760 and 762, tilting them to the right, as seen in Fig. 26, and then passes by them allowing them to snap back behind the edges of the box, so that upon the return movement of the block carrying the box, the box is held from returning by the stripper fingers and deposited on the guide plate 750, as indicated in Fig. 26. From here it is pushed onto a constantly driven discharge conveyor 764 adjacent the guide plate 750 by the next box to arrive at this station.

The stripper fingers 756, 758, 760 and 762 are rotatably mounted on brackets 766, 768, 770 and 772, which are secured to brackets 774, 776, 778 and 780 in a manner to permit horizontal adjustment thereon. The brackets 774, 776 and 780 are secured to the frame of the machine in a manner to permit vertical adjustment thereon. Coiled springs 782, 784, 786 and 788 surrounding the pivots 790, 792 794 and 796 on which the stripper fingers are mounted, normally urge the fingers 756 and 758 against the presser roll 684 and the fingers 760 and 762 against the presser roll 686.

Referring particularly to Fig. 10, the banding mechanism for applying the banding strip to the boxes successively brought to the banding station upon movement of the spider through the successive steps of each cycle of its operation, is herein shown as including the presser roll 304. In Fig. 10 of the drawings the parts of the banding mechanism are shown in the position they assume at the start of the banding operation with the end of the banding strip 302 held between the presser roll 304 and a box 306 on the block 130 near one corner thereof, the end of the banding strip having been previously fed into a position where it could be grasped between the roll and the box by the paper feed mechanism as will be described. The presser roll 304 is rotatably mounted on the upper end of an arm 306 pivotally mounted at 308 in the forked outer end of an arm 310 pivoted at 312 to a bracket 314 secured to the frame of the machine. A spring 316 connected between the arm 310 and an arm 318 integral with the arm 306 serves to maintain the presser roll 304 in contact with the box during the banding operation.

A tendency has existed in the machines heretofore used in banding boxes, for the presser roll to be thrown away from the periphery of the box while passing from the longer to the shorter sides thereof, because at the relatively high speed which the roll attains with respect to the surface of the box at this point, the spring 316 is not able to act quickly to cause the roll to hug the corner. To offset this tendency, provision is made for controlling the rate of movement of the presser roll around the periphery of the box, to preferably cause movement at a substantially uniform speed, thus allowing the spring 316 to hold the roll in contact with the box at all times. To this end, the upper end of a link 320 is pivotally secured to the arm 310 and its lower end is similarly secured to the end of one arm 322 of a bell crank lever 324 pivotally mounted on a shaft 326 carried by brackets 328 secured to the frame and carrying at the end of its other arm 330 a cam roll 332 which cooperates with a surface cam 334 secured to a rotatable shaft 336, to rock the arm 310 through these connections. A spring 338 connected between the arm 322 and the frame of the machine holds the roll 332 against the surface of the cam.

It is apparent from an inspection of Fig. 10 that if the pivot 308 were fixed the relative rate of movement of the presser roll with respect to the surface of the box would be a maximum when the roll was at the corners of the box and a minimum when the roll was at the center of the longer sides. It may also be seen that if the arm 310 and roll 304 are caused to move upwardly while the box is rotating in a clockwise direction (see Fig. 10) during the banding operation, the relative speed between the roll and the surface of the box is increased, while if the roll is moved downwardly this relative speed is decreased. Therefore, the cam 334 is so shaped as to cause the roll 304 to move upwardly when moving from the corners of the box towards the center of the longer sides so as to increase the relative rate of movement of the roll with respect to the box at this time and to cause it to move downwardly when moving from the center of the longer sides towards the corners so as to decrease this rate of movement at this time. This results in the roll moving over the surface of the longer sides at a practically uniform rate of speed. While the roll is travelling over the surface of the shorter sides of the boxes, the cam 334 is so shaped as to cause no change in the position of the arm 310 and pivot 308 as there is little change in the relative rate of speed of the roll with respect to the surface of the box at this time with the pivot 308 fixed, and the spring 316 is able to keep the roll in contact with the box.

In order that the roll 304 may be swung out of the path of the block carrying the banded box when the latter is fed to the folding station, provision is made for swinging the arm 306 carrying the roll 304 outwardly at this time. To this end an arm 340 is pivoted at its lower end at 342 to a bracket 344 secured to the frame of the machine and has adjustably secured to its upper end a shoe 346 adapted to cooperate with a roll 348 pivoted in the end of an arm 350 formed integrally with the arm 306 to swing this arm and the roll 304 to the right in Fig. 10 against the pull of the spring 316. The arm 340 is swung to the left to cause this movement of the roll 304 by the engagement of a cam roll 352 adjustably secured to the arm 340, with the surface of a cam 354 secured to the shaft 336. A spring 356 connected between the arm 340 and a bracket 358 secured to the frame of the machine holds the roll against the surface of the cam 354.

The paper feed mechanism is shown partly in Fig. 10 and wholly in Fig. 11. In the latter figure the paper strip 302 is shown as leading from supply rolls 359 supported on the frame of the machine. There are two of these rolls shown to accommodate paper strips of different colors or grades. A feed roll 360 draws the paper from the supply rolls through tension devices 361 over a glue roll 362 and around guide rolls 363. The paper then passes through a scraping device 364 to a guide roll 366, under a gravity take-up roll 368 mounted to slide in vertical guideways 370 on carriers 372, over a second guide roll 374 to the top of a paper carrier 376 slidably mounted in a bracket 378 secured to the frame of the machine. On this carrier paper feed fingers 380 are mounted to rest on top of the paper in such a way that when the carrier is moved to the left, as seen in Figs. 10 and 11, the paper is gripped between the fingers and the carrier and fed with them, but upon movement of the carrier to the right or when the paper is pulled to the left while being wound about the box during the banding operation, the paper slides between the fingers and the carrier. In order to secure this movement of the carrier, a link 382 is pivotally secured to a lug 384 on the carrier. This link has adjustably secured to it a block 386 pivotally secured to the upper end of a lever 388 pivoted at 390 to a bracket 392 secured to the frame of the machine. The lower end of the lever 388 is adjustably pivoted to one end of a link 394, the other end of which is pivoted to a cam arm 396 pivotally mounted on the shaft 326. A cam roll 398 pivoted to the arm 396 cooperates with a cam groove in a cam 400 to give the desired movement to the carrier 376 through these connections.

In order to draw off the paper strips from the supply rolls 359, provision is made for constantly driving the feed roll 360 at any desired rate of speed. To this end a chain 402 driven by a sprocket 404 on the shaft 336 drives a shaft 406 by means of a sprocket 408 secured to it. The shaft 406 also has secured to it a friction driving disk 410 cooperating with a friction roll 412 splined to a vertical shaft 414. The friction roll 412, and disk 410 constitute the well-known variable friction clutch by which the speed of the shaft 414 may be varied. The shaft 414 has secured to its upper end a worm 416, the latter driving a worm wheel 418 secured to the shaft 420, to which the feed roll 360 is also secured.

Prior to the start of the banding operation, the end of the banding strip 302 is fed by the paper feed mechanism to a position where it may be grasped between the presser roll 304 and the surface of the box to be banded near one corner thereof. This occurs just before the block carrying this box comes to rest at the banding station. Thereafter, during the banding operation, the winding of the paper strip about the box causes it to exert a pull on the gravity roll 368 and to lift the latter high enough to draw off enough paper for this operation.

Near the end of the banding operation, provision is made for cutting the paper strip into a length such that its ends will overlap for about one inch near the corner of the box. To this end a pair of shear arms 422 and 424 carrying cooperating upper and lower shear members 426 and 428 are pivotally mounted at 430 to a bracket 432 mounted on a second bracket 434 secured to the bracket 378. In order that the shear members may be actuated to sever the banding strip, the shear arms 422 and 424 are connected by links 436 and 438 respectively, to the cam arm 440 which is pivoted at 442 to the frame and which has pivotally secured to it a cam roll 444 which engages a cam groove in a cam 446 secured to the shaft 336, the groove in the cam 446 being of such shape as to cause the shear members to move together from the position shown in Fig. 10 to sever the paper strip at the proper time and then to move back to their original positions.

When the shear members are moved together to sever the paper strip, as above described, it is necessary that the paper carrier 376 be moved to the right from the position shown in Fig. 10 in order that the shear members may clear it. Also after the completion of the banding operation, when the banded box has been fed out of the way and before the next box to be banded reaches the banding station, the paper carrier must be returned to the position shown in Fig. 10 so that the severed end of the paper strip may be in position to be gripped between this box and the presser roll to start the banding operation on this box. The groove in the cam 400 is of such shape as to cause these movements of the paper carrier at the proper time. During the time that the carrier 376 is in retracted position, a shelf 448 mounted on the bracket 432 serves to support the severed end of the paper strip.

In order that the box in process of banding may be securely held on its block during this operation, a rotatable pusher is yieldingly held against the bottom of the box at this time. This pusher, shown at 450 in Figs. 9 and 10, is rotatably mounted in the upper end of the vertical arm 452 of a bell crank lever pivotally mounted at 454 to a bracket 456 secured to the frame. The horizontal arm 458 of this bell crank lever is connected by a link 460 to the horizontal arm 462 of a bell crank cam lever which is pivoted at 464 to a bracket 466 secured to the frame and which carries at the upper end of its vertical arm 468 a cam roll 470 which engages a cam surface 472 on the front face of a cam disk 474 secured to the shaft 336. A spring 476 connected between pins on the arm 458 and the bracket 456 holds the roll 470 in yielding engagement with the cam surface 472.

If, during the operation of the machine, the transfer mechanism should fail to place a box to be banded upon the block at the receiving station, provision is made for rendering the paper feed inoperative and consequently the banding mechanisms. This mechanism is arranged, however, to have no effect on the other operations performed by the machine, and if, subsequently, a box is placed upon a block at the receiving station, the paper feed and banding mechanisms are automatically rendered operative in order that a paper strip may be wound about the box upon arrival at the banding station.

In order to thus control the operation of the paper feed and banding mechanisms, a feeler finger 478 is adjustably secured in an arm 480 adjustably clamped to the forward end of a rock shaft 482 journalled in brackets 484 and 486 secured to the frame of the machine. As shown in Figs. 9 and 10, the lower end of the feeler finger 478 will be in the path of the box 485 on the block 128 shown at the receiving station as both are moved from this station to the banding station, and the feeler finger and shaft 482 will be swung in a counter-clockwise direction (viewing Fig. 10) by the box during this feeding movement. If, however, no box was placed on the block 128 at the receiving station, a groove 487 formed in the outer end of the block permits the latter to be fed from the receiving station to the banding station without effecting or moving the feeler finger 478 or the shaft 482. An arm 488 is secured to the rear end of the rock shaft 482 and is provided with a rod 490 pivotally secured to its outer end thereof and to which is adjustably clamped at its lower end a block 492 pivotally secured in the end of one arm 494 of a bell crank lever 496 pivoted at 498 to a bracket 500 secured to the frame, (Figs. 9, 10 and 12). A link 504 is pivotally secured to the end of the other arm 502 of the bell crank lever, and the other end of the link is pivotally secured to the end of one arm 506 of a clutch lever 508 pivoted on a stud 510 fixed to the frame.

In order to limit the rocking movement of the shaft 482 a forwardly extending fin 512 is formed on the hub of the arm 488 which is adapted to be engaged by stop screws 514 and 516 adjustably secured in lugs 518 and 520 upstanding from the bracket 486. When the rock shaft 482 is swung in a counter-clockwise direction, as seen in Fig. 10, by the engagement of a box with the feeler finger 478, the bell crank lever 496 will be moved in a counter-clockwise direction (viewing Fig. 12) and the clutch lever 508 will be rocked in a counter-clockwise direction as seen in Fig. 14. Obviously, if the feeler finger 478 is not engaged by a box in this manner there will be no movement of the clutch lever 508 and it will remain in the position shown in Figs. 9, 12, 13 and 14.

This movement or lack of movement respectively of the clutch lever 508 controlled by either the presence or absence of a box on a block moving from the receiving station to the banding station is utilized to hold in engagement or to disengage respectively the tight and loose clutch members 522 and 524 on the shaft 336. In Fig. 13 the clutch member 522 is shown keyed to the shaft 336 and the clutch member 524 which cooperates with it and which is constantly driven from the shaft 190 by means of gears 526 and 528 (see Fig. 9), is loosely mounted on the shaft 336. In order that the clutch member 524 may drive the clutch member 522 and shaft 336, an outwardly spring pressed clutch dog 530 is mounted to move radially in the member 522. A projection 532 on this clutch dog is adapted to engage a radial slot 534 formed in the annular ring 536 on the inner face of the member 524 and thus lock the clutch members 522 and 524 together.

Previous to the engagement of a box with the feeler finger 478, a second arm 538 of the clutch lever 508 will be in the position shown in Figs. 12, 13 and 14. If the feeler finger is not engaged by a box, the clutch lever will remain in the position shown in these figures and upon rotation of the clutch member 522 to the position shown the end of the clutch dog 530 will engage a cam surface 540 on the arm 538 and be pushed radially inwardly to thereby disengage the projection 532 from the slot 534. After the clutch dog has been thus moved to disengage the clutch members a stop lug 542 on the face of the member 522 engages the end of the arm 538 to stop the member 522 and shaft 336 in the position shown.

If, however, the feeler finger is engaged by a box so as to rock the clutch lever through the connections described, the cam surface 540 on the arm 538 will be swung out of the path of the clutch dog 530 and the projection 532 on the latter will remain in engagement with the clutch member 524 so as to drive the member 522 and shaft 336 and allow the box to be banded upon arrival at the banding station.

In order that the parts may be returned to feeling position so as to detect the presence or absence of a box on the next following block, a cam surface 544 on the clutch member 522 engages the end of a third arm 546 of the clutch lever 508 so as to swing it in a clockwise direction (viewing Fig. 14) to the position shown in that figure.

It may be seen from Fig. 13 that the sprocket 404 is secured to the clutch member 522. As this sprocket drives the mechanism which draws off paper from the supply rolls 359, this mechanism will be rendered inoperative when the shaft 336 is stopped as well as the paper feed and banding mechanisms which are controlled by cams on this shaft.

While the preferred embodiment of the invention has been illustrated and described, it is to be understood that viewed in its broader aspects, certain features of the invention may be embodied in other forms within the scope of the following claims.

Having thus described the invention, what is claimed is:—

1. In a box banding machine, in combination, a rotatable spider, a plurality of box holding devices mounted upon the spider, means for wrapping a banding strip about a box while said box and its block are at certain of said stations, and means for pressing the banding strip thus applied while the box is at another of said stations, said means including a plurality of yieldable presser rolls and means for relatively moving the box with relation to said presser rolls.

2. In a box banding machine, in combination, a spider, a plurality of blocks secured to shafts pivotally and slidably mounted at spaced intervals on the periphery of said spider, means for intermittently rotating said spider through amounts equal to said intervals to move each of said blocks successively to a box receiving station, a banding station, a folding station, and a presser and stripper station, means for rotating each of said blocks while at the banding station, and means for moving each of said blocks longitudinally of said shafts while at the folding station and at the presser and stripper stations.

3. In a wrapping machine, the combination with an article holding device for holding the article to be wrapped, a supporting member in which the article holding device is rotatably mounted, mechanism for intermittently revolving the supporting member to present the article holding device to successive stations including a wrapping station, wrapper feeding means, a presser member for pressing a wrapper against the article, and mechanism for rotating the article holding device while at the wrapping station including an oscillatory element, connections between the oscillatory element and supporting member, and connections between the oscillatory element and article holding device.

4. In a wrapping machine, the combination with an article holding device for holding the article to be wrapped, a supporting member in which the article holding device is rotatably mounted, mechanism for intermittently revolving the supporting member to present the article holding device to successive stations including a wrapping station, wrapper feeding means, a presser member for pressing a wrapper against the article, and mechanism for rotating the article holding device including a rotary actuating elements and connections between said rotary element and the supporting member for intermittently revolving the latter, and connections between said rotary element and the article holding device for rotating the article holding device with relation to the supporting member.

5. In a wrapping machine, in combination, a revoluble spider, a plurality of article holding devices rotatably mounted upon said spider and each provided with a gear, means for revolving said spider through a plurality of stations, one of the stations comprising a wrapping station, wrapper feeding means, a presser member for pressing a wrapper against the article, and means for effecting rotation of successive article holding devices while at the wrapping station including an oscillatory actuating gear adapted to cooperate with successive of the aforesaid gears, means for controlling the movement of said actuating gear to cause it to be engaged with successive of the aforesaid gears when the particular article holding device is moved into the wrapping station.

In testimony whereof I have signed my name to this specification.

STANLEY R. HOWARD.